United States Patent [19]
Rose

[15] 3,675,122
[45] July 4, 1972

[54] TWO-WIRE CURRENT TRANSMITTER EMPLOYING A STABILIZED CURRENT SOURCE IN ONE ELECTRICAL CIRCUIT CONTAINING CONTROL MEANS IN SERIES THEREWITH FOR CONTROLLING A DIRECT CURRENT AMPLIFIER CONTAINED IN A PARALLEL CIRCUIT

[72] Inventor: Robert C. Rose, Minneapolis, Minn.
[73] Assignee: Rosemount Engineering Company, Eden Prairie, Minn.
[22] Filed: Oct. 27, 1969
[21] Appl. No.: 869,687

[52] U.S. Cl. ...............................324/62, 73/362, 307/297, 323/9
[51] Int. Cl. ..............................................G01r 27/02
[58] Field of Search ......................324/57, 62; 323/22, 9; 307/297; 330/9; 73/362

[56] References Cited

UNITED STATES PATENTS 3,322,971   5/1967   Liu...................................307/297
3,408,584  10/1968   Miller, Jr. et al. .................330/9
3,517,556   6/1970   Barker..............................73/362

Primary Examiner—Rudolph V. Rolinec
Assistant Examiner—David M. Carter
Attorney—Dugger, Peterson, Johnson & Westman

[57] ABSTRACT

A transmitter controls the flow of load current through only two wires in accordance with the magnitude of a variable condition. Within the transmitter the current follows two paths, one portion of the current flowing through a direct current amplifier and the remaining portion flowing through a stabilized current source which provides the sole energization for certain components, including a condition responsive bridge network, in order to operate the DC amplifier in response to the condition sensed by the bridge network. The current recombines to constitute the load current that is indicative of the magnitude of the variable condition.

13 Claims, 2 Drawing Figures

INVENTOR.
ROBERT C. ROSE

BY

Dugger, Peterson, Johnson & Westman
Attorneys

TWO-WIRE CURRENT TRANSMITTER EMPLOYING A STABILIZED CURRENT SOURCE IN ONE ELECTRICAL CIRCUIT CONTAINING CONTROL MEANS IN SERIES THEREWITH FOR CONTROLLING A DIRECT CURRENT AMPLIFIER CONTAINED IN A PARALLEL CIRCUIT

BACKGROUND OF THE INVENTION

1. Field of the Invention

This invention relates generally to a measuring system embodying a current transmitter having only two wires connected in circuit therewith which carry the direct current power to the transmitter and also which current is adjusted to represent the magnitude of the change in a variable condition, and pertains more particularly to a current transmitter utilizing a stabilized current source which provides accurate control of the load current as a function of the variable condition being measured while encountering wide variation in ambient temperature environments and applied voltage levels.

2. Description of the Prior Art

The state of the art has been generally dealt with in the patent application of Earl A. Grindheim, Ser. No. 661,988, filed Aug. 21, 1967 now abandoned and continuation Ser. No. 14,748 has been substituted therefore, for "Two-Wire Current Transmitter Responsive to a Resistance Sensor Input Signal" and assigned to the same assignee as the present invention. While the transmitting system described in the Grindheim application has performed admirably well, the invention herein illustrated is intended to be an improvement over the Grindheim transmitter in certain respects that will hereinafter become manifest.

SUMMARY OF THE INVENTION

One object of the invention is to provide a two-wire transmitter that will require only a small amount of power for its operation, this being accomplished by reducing both the voltage and current needed by the transmitter.

Another object of the invention is to provide a two-wire transmitter that will accommodate a wide range of supply voltages. In this regard, although the transmitter will function with a low supply voltage, the series load resistance employed by the user may be as great as a few thousand ohms and should it become shorted the transmitter must withstand the full supply voltage. While a system can be designed to operate with high supply voltages, the system then encounters difficulty when the voltage is low. It is an aim of the present invention to provide a transmitter that will operate on approximately 17 volts and yet which will withstand voltages approximately 3-½ times the rated value.

A very important object of the invention is to provide a highly stabilized current source, both as to voltage and temperature. More specifically, the current source herein illustrated is stable over a 25 to 1 voltage ratio, is capable of withstanding a ratio of 35 to 1, and is temperature compensated from −40° to +85° C.

Still further, an object of the invention is to provide a current source that does not require the selection and utilization of special resistors or other expensive components, thereby enabling the entire transmitter to be manufactured at a relatively low cost.

Yet another object of the invention is to provide a transmitting system in which virtually the entire current source output is made available to the condition responsive bridge.

Generally, an overall object of the invention is to provide a current transmitter that will provide an accurate indication of the magnitude of the variable condition being measured and which will do so where the transmitter and load are at widely separated locations and which will remain accurate despite large load resistance variations.

A still further object of the invention is to provide a transmitting system where the current flowing through the sensor can be on the order of only 1 to 1.4 milliamperes. In this regard, the transmitter makes use of two principal current paths, only one path involving the sensor. The divided or separated current portions, however, are subsequently recombined and the total current is closely regulated by the transmitter to permit meters, recording equipment and the like to be accurately operated thereby.

Consequently, a general object of the invention is to provide a transmitter that controls a current that is representative of a condition being measured, doing so in a highly accurate manner irrespective of voltage, load resistance and ambient temperature changes and also with a minimal amount of power, and having the current precisely proportional to the quantity being measured even though that quantity may vary over a relatively wide range. Hence, the transmitter herein illustrated possesses a number of long sought after attributes which collectively contribute to a reliable and accurate measuring system.

Quite briefly, the invention envisages a transmitter that is connected in series with only two wires through which the load current flows, the load current being furnished by an external power source. The transmitter is operated by the load current and functions to vary the magnitude thereof in accordance with the particular condition being sensed. Two current paths are provided within the transmitter, one path being through a DC amplifier, the remaining current portion flowing through the second path. The current portion traversing the second path is used for energizing the condition responsive bridge network and also the alternating current amplifier that is responsible for controlling the DC amplifier, which is in the first path, in accordance with the amount of variation in the condition being measured. Note also that the current through the DC amplifier path also flows through a portion of the bridge network as described in said Grindheim application. The current through the bridge network, and also the AC circuitry, is stabilized or regulated to a high degree by zener diodes that derive their current from a current source that can withstand relatively high voltages. The constant current source is also temperature compensated so as to enhance its accuracy and in turn increase the overall precision of the transmitting system.

DESCRIPTION OF THE PREFERRED EMBODIMENT

Figure 2:
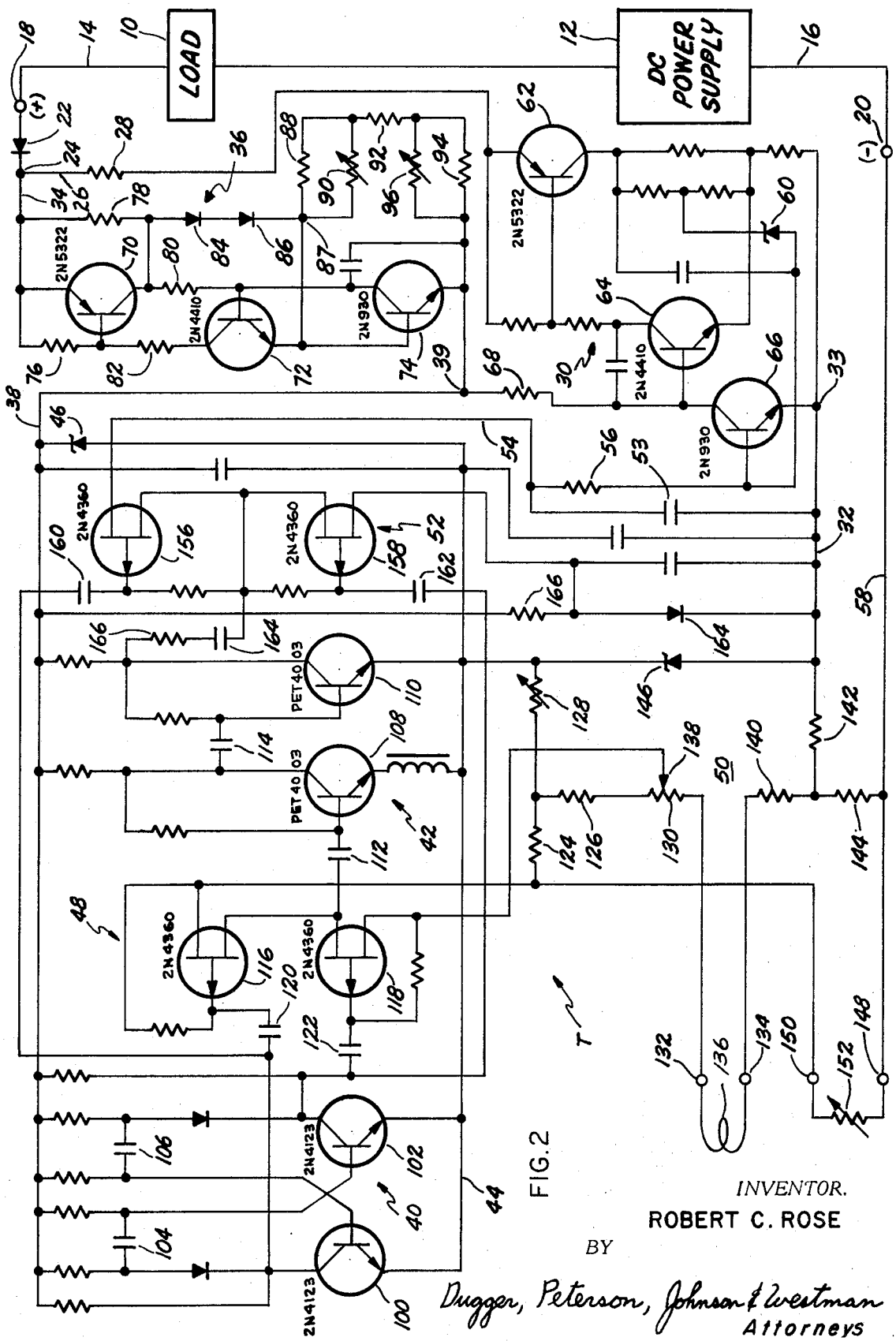
FIG. 2 is a diagram, mostly in schematic form, corresponding generally to what appears in FIG. 1 but with the load and D.C. power supply added thereto.

Referring to the drawings, it will be seen from FIG. 2 that a load has been indicated by the reference numeral 10. The load 10 may be a milliammeter, a recorder, or any utilization device. The load 10 is connected in series with a direct current power supply 12 which provides all of the power utilized by the circuitry hereinafter described. It will be understood that a single pair of wires 14 and 16 constitute the only conductors that both supply power to the transmitter hereinafter discussed and also carry the signal current. Stated somewhat differently, the two wires 14, 16 constitute the signal channel and the load current flowing through these wires is thus indicative of the amount of variation that takes place as far as the particular condition to be measured is concerned. It is also to be recognized that the two wires 14, 16 are of indeterminate length. Actually, the load 10 and the power supply 12 may be located at one vantage point and the transmitter hereinafter described at a remote distance that can be quite appreciable.

The transmitter, which will be designated generally by the letter T, has a pair of terminals 18 and 20 that are connected to the ends of the two wires 14 and 16. Included in the transmitter T is a diode 22, the diode 22 functioning to safeguard the transmitter circuitry should the user thereof inadvertently reverse the polarity of the power supply 12 when initially making up the connections. It is to be noted that the power supply 12 shown in FIG. 2 should be connected so as to apply a positive polarity to the terminal 18 and a negative polarity to the terminal 20. Whereas the anode of the diode 22 is connected directly to the terminal 18, the cathode thereof is connected to a junction labeled 24. Although all of the current flowing through the load 10 passes through the wires 14 and 16, the load current separates at the junction 24 so that it traverses two parallel paths or circuits.

Figure 1:
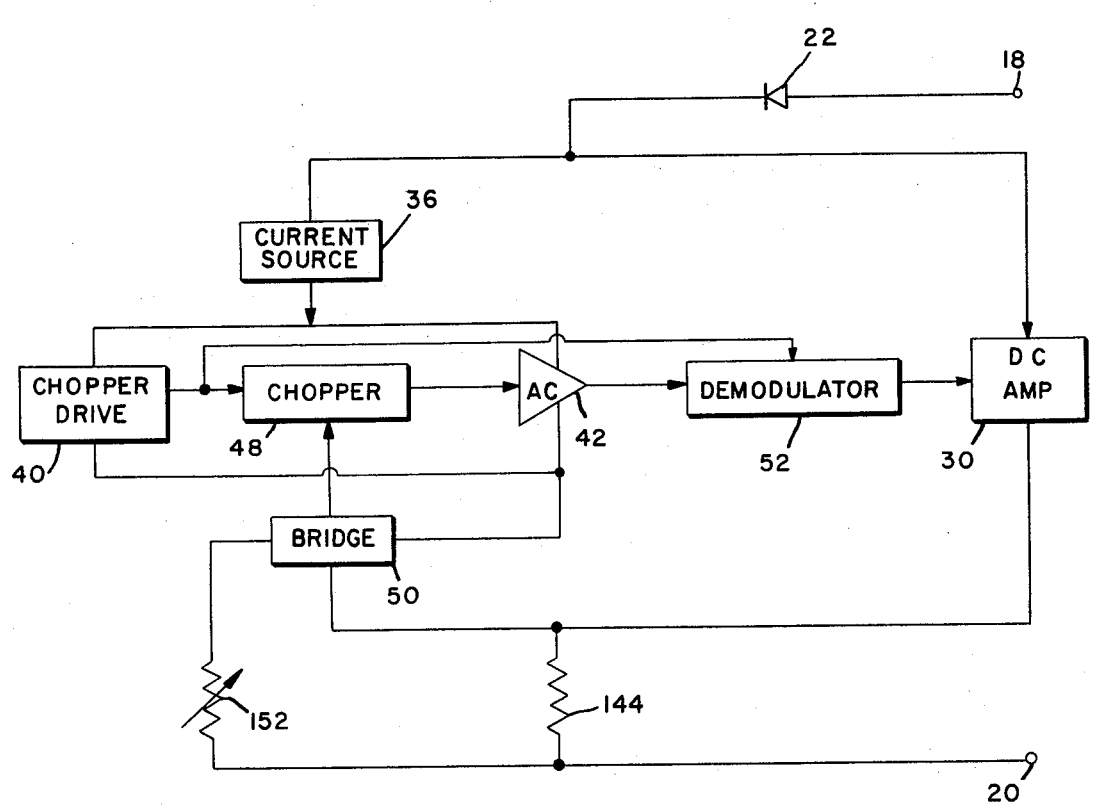
FIG. 1 is a diagram, for the most part in block form, illustrating an exemplary transmitter constructed in accordance with the teachings of the invention.

The first path or circuit that one portion of the load current follows is via a conductor 26 and a current limiting resistor 28 to a direct current amplifier 30. Although the direct current amplifier 30 is not unique, it will be well to reserve a more detailed description thereof until after various circuit sections constituting the transmitter T (of which the amplifier 30 is a part) have been referred to. In this way, a general picture can be presented in FIG. 1 with respect to the various functions that occur within the transmitter T and the particular components contained in the various circuit sections that provide the functions will be considered with greater particularity hereinafter in conjunction with FIG. 2. It will be helpful, though, to note that a conductor 32 is connected to the output terminal labeled 33 of the amplifier 30 and carries the current flowing through the particular path or circuit that includes the amplifier 30 so that it its recombined with the current flowing through the second parallel path or circuit that will now be described.

The second path or circuit over which the remaining portion of the load current flows, that is the portion not traversing the first circuit which contains the amplifier 30, includes a conductor 34 leading from the junction 24 to a constant current source 36 which plays a very important role in the practicing of the invention. As will be made manifest as the description progresses, the source 36 stabilizes the current passing therethrough irrespective of voltage and temperature variations to which the transmitter T may be subjected.

A conductor 38 extends from the output terminal 39 of the constant current source 36 to a chopper drive or multivibrator 40. The same conductor 38 also supplies current from the source 36 to an alternating current carrier amplifier 42. An additional conductor 44 connects the other sides of the circuit sections 40 and 42, that is, the other sides of the chopper drive and the AC amplifier, together. In other words, the circuit sections 40 and 42 are regulated by a zener diode 46, the diode 46 being connected between the conductors 38 and 44 and carrying a portion of the stabilized current provided by the current source 36.

A chopper or modulator 48 is connected to a condition responsive resistance bridge network 50. The chopper 48 controls the carrier amplifier 42 so that the amplified output therefrom is delivered to a detector or demodulator 52 which in turn controls the first stage of the previously mentioned DC amplifier 30, doing so via a conductor 54 and a coupling resistor 56. Although the network 50 has not as yet been described in detail, it will be discerned that another conductor 58 extends from the bridge network to the terminal 20, this particular conductor 58 carrying the recombined current from the direct current amplifier 30 which is delivered via the conductor 32 and the stabilized current that has passed through the bridge network 50 as provided by the constant current source 36.

Considering now the various circuit sections in greater detail, attention is first directed to the DC amplifier 30. Collectively, the amplifier includes a PNP transistor 62 and an NPN transistor 64 which together provide relatively high current gain. A zener diode 60 is connected so as to provide a current limiting function. Still another NPN transistor 66 is included in the amplifier 30, this constituting the first stage of the amplifier and having its base connected to the output side of the demodulator 52 through the resistor 56 and conductor 54. The collector of the transistor 66 is connected to the current source 36 through a resistor 68 and its emitter is connected to the conductor 32 at the junction 33. The signal derived from the demodulator 52 is thus used to control the amplifier 30 in accordance with the magnitude of its detected output signal.

Of appreciable importance to the invention is the makeup of the constant current source 36. In this regard, it will be discerned that the current source 36 comprises a first PNP transistor 70, a second NPN transistor 72 and a third NPN transistor 74, the collector-emitter of the transistor 74 having capacitor 75 connected thereacross to provide dynamic stability. A resistor 76 is connected across the emitter and base of the transistor 70. However, in order to cause conduction of the transistor 70 when only a relatively low voltage is applied via the junction 24, there is a resistor 78 connected between the emitter and collector of the transistor 70 and through resistor 80 to the base of the transistor 72, an initial current path can be established which is effective in turning on the transistor 72 which otherwise would remain non-conductive. The transistor 72 has a resistor 82 connected between its collector and the base of the transistor 70. In this way, the current flowing due to the initial conduction of the transistor 72 is instrumental in causing transistor 70 to commence conduction.

The principal current path during operation of the constant current source 36 is through the transistor 70 and through a pair of diodes 84 and 86. It should be explained at this time that the diodes 84, 86 do not start conducting immediately but require a voltage buildup such that the difference across the two will approximate one volt, that is, approximately 0.5 volt across each in order to render them conductive. This insures that transistor 72 will commence conduction.

Further, included in the current source 36 is a temperature compensating bridge network composed of a resistor 88 shunted by a thermistor 90. It will be perceived that one end of the resistor 88 is connected to the cathode of the diode 86 and also to the emitter of the transistor 72 at a junction denoted by the reference numeral 87. The other end of the resistor 88 is joined to a resistor 92 and the opposite end of the resistor 92 is attached to a resistor 94, this last resistor 94 being shunted by a thermistor 96. Briefly, the thermistor 90 is effective as far as its corrective effort is concerned from approximately −15° to 85° C. Below −15° C, without the thermistor 90 included, the current would increase quite substantially and it is through the coaction provided by the two thermistors 90 and 96 that excellent temperature compensation is derived over the range of from approximately −40° to +85° C.

The base of the transistor 74 is connected to the emitter of the transistor 72 and also to the cathode of the diode 86. As explained above, and which is evident from the schematic diagram, this arrangement results in a connection of the base of the transistor 74 to the junction 87. Thus, should the current delivered to the resistance network, which is composed of the various resistors 88, 92, 94 and the thermistors 90, 96, increase, the voltage will increase at the junction 87. The function of the transistor 74 is to react to the changing voltage at the top of the resistance network, that is at the junction 87 and to limit it. In this way, if the current through the resistance network 88–96 should increase, then the voltage will rise slightly at the junction 87 to cause the transistor 74 to increase conduction by reason of the slightly increased positive voltage that is thus applied to its base. However, owing to this happening, the base of the transistor 72 becomes more negative with the consequence that the conduction of this particular transistor is decreased. Therefore, less current is supplied to the junction 87 through the transistors 70 and 72 and the result is that the current at the output junction 39 of the current source 36, is maintained relatively constant. Temperature variations that affect the base-emitter volt-drop of transistor 74 are tracked by the resistance network 88–96 such that at constant current the network's volt-drop matches the temperature coefficient of transistor 74. Thus, changing temperatures do not change the output current. When the temperature to which the current source is subjected increases, then the resistance of the above-alluded to network decreases.

As far as the chopper drive or multivibrator 40 is concerned, it is conventional. In this regard, it will be observed that it includes a pair of NPN transistors 100 and 102. The bases of these transistors 100, 102 are interconnected through cross-coupling capacitors 104 and 106 that cause the transistors 100 and 102 to alternate back and forth as far as their conductive states are concerned. The chopper drive multivibrator 40 is energized, as can be seen from the schematic diagram, by the difference in potential existing between the conductors 38 and 44.

Also energized from the potential difference between the conductors 38 and 44 is the AC carrier amplifier 42. In the illustrative instance, it will be discerned that the amplifier 42 consists of two stages, being composed of a first NPN transistor 108 and a second NPN transistor 110. The first transistor 108 is coupled to the chopper or modulator 48 via a capacitor 112, whereas the collector of this transistor 108 is coupled to the base of the transistor 110 os the second amplifying stage by means of a capacitor 114.

Passing now to a detailed description of the chopper of modulator 48, it will be seen that this circuit section is comprised of two field effect transistors 116 and 118, the gates of the two field effect transistors being coupled in one instance by a capacitor 120 connected to the collector of the transistor 100 constituting part of the chopper drive or multivibrator 40. In similar fashion, the gate of the other field effect transistor 118 is coupled to the collector of the transistor 102 of the chopper or multivibrator 40 through the agency of a capacitor 122. Thus, the chopper 48 performs its chopping function by having the transistors 116 and 118 alternately gated into a conductive state through the agency of the chopper drive or multivibrator 40. Stated somewhat differently, when the transistor 100 of the chopper or multivibrator 40 is non-conductive, the collector thereof will be at virtually the same potential as the conductor 38, whereas the then conducting transistor 102 will have its collector at virtually the potential of the conductor 44. Hence, with the staged voltage applied to the gate of the field effect transistor 116, this particular field effect transistor of the chopper or modulator 48 will be non-conductive and with the lower collector potential applied to the gate of the other field effect transistor 118 of the chopper or modulator 48 it will be conductive. As is typical with modulators, the switching action that occurs will in turn drive the respective field effect transistors 116 and 118 into alternately conductive and non-conductive states.

The condition responsive resistance bridge network 50 is utilized for sensing any changes in the particular variable condition to be measured. In achieving this aim, the network 50 comprises a fixed resistor 124 connected to one end of a fixed resistor 126, the junction of the resistors 124, 126 being connected to the previously mentioned conductor 44 through an adjustable resistor 128. The resistor 126 has its other end connected to one end of a potentiometer 130 that has its other end in turn connected to a terminal 132. There is a corresponding terminal 134 so that dummy leads 136 connected between the terminals 132, 134 constitute a compensation loop intended to offset any resistance appearing in the leads connected to terminals 148 and 150 other than that of resistor 152. The potentiometer 130 has a wiper arm 138 that is connected to the source of the field effect transistor 118 contained in the chopper or modulator 48. Another fixed resistor 140 has one end attached directly to the terminal 134 of the compensating loop and its other end connected to the junction of two fixed resistors 142 and 144. The resistor 142 is connected to the conductor 32 that extends from the output side of the DC amplifier 30. The resistor 144, as will be soon made clear, functions as a feedback resistor. However, there is a stabilizing diode 146 connected between the other end of the resistor 142, that is the end remote from the end thereof that is connected to the junction of the resistors 140 and 144, and the diode 146 is also, as is obvious, connected to said conductor 32. The diode 146 is of the zener type and together with the resistor 142 maintains a reference voltage on the wiper arm 138 of the potentiometer 130. The resistor 144, functioning as a feedback resistor as explained above, has the other end thereof, that is the end remote from the resistors 140 and 142, connected to the terminal 20. The terminal 20, as is evident from the diagram, is likewise connected to a terminal 148, the terminal 148 having a companion terminal 150. It is between the two terminals 148, 150 that the sensing element labeled 152 is connected. Thus, the particular sensing element, whether it be a temperature sensitive resistor or some other element capable of providing a variable voltage in accordance with the condition being sensed can be readily changed, the terminals 148, 150 affording the opportunity for substitution. The terminal 150 not only connects directly to one end of the previously mentioned resistor 124 but also is connected to the drain of the field effect transistor 116.

Describing with greater particularity the demodulator or detector 52, it will be seen that this demodulator includes a pair of field effect transistors 156 and 158. As with the chopper or modulator 48, the gates of the two field effect transistors 156, 158 are tied or coupled to the collectors of the transistors 100 and 102 of the chopper drive or multivibrator 40 by way of capacitors 160 and 162, respectively. The two sources of the transistors 156 and 158, these transistors being of the field effect variety as mentioned above, are connected together and are in turn connected to the collector of the transistor 110 belonging to the second stage of the AC carrier amplifier 42, the connection or coupling being through a capacitor 164 and a resistor 166. In this way, the output from the AC carrier amplifier 42 is demodulated by the field effect transistors 156 and 158 in correspondence with the switching action taking place at the chopper drive or multivibrator 40. When the field effect transistor 156 is conductive, then the signal arriving from the AC carrier amplifier 42 is delivered directly to the filter capacitor 53 connected between lines 54 and 32 and to the first stage of the DC amplifier 30 via the conductor 54 and resistor 56. On the other hand, when the other transistor 158 is rendered conductive, there is a path provided through a diode 164, the diode 164 being forwardly biased by means of a resistor 166. In other words, the resistor 166 and the diode 164 are serially connected between the conductors 38 and 32.

Having presented the foregoing description, the general manner in which my transmitter T operates should be understood. The input current, this being the load current through the load 10 and the serially connected wires 14 and 16 passes through the current terminal 18 and then through the diode 22. It is at the junction 24 that this load current separates after having passed through the protecting diode 22. A variable portion of the current flows through the conductor 26, the resistor 28 and is controlled by the DC amplifier 30. A fixed amount is allowed to pass through the current source 36. It should be kept in mind that the current through these two circuits recombines. However, at this time it will be emphasized that the current from the current source 36 is regulated as far as voltage and temperature is concerned and serves to energize the multivibrator 40, the carrier amplifier 42 and one stage of the DC amplifier 30, this being the stage that includes the transistor 66. Also, the current that flows through the current source 36 energizes the bridge network 50. However, the current recombines and the total current flowing through the terminal 20 is the same as that entering the transmitter T via the terminal 18.

While the network 50 functions in the same manner as the resistance network shown in said Grindheim application, it should be pointed out that any unbalance of the bridge voltage between terminals 150 and 138 caused by either a change in the variable condition sensed by the sensor or sensing element 152 or a difference between the desired current and the actual amount will be reflected in the output from the chopper 48. Since the output from the chopper 48 is amplified by the AC carrier amplifier 42, the amplified signal, which is representative of the magnitude of the error sensed by the bridge 50, will cause the value of the signal from the demodulator 52 to control the input to the DC amplifier 30. Consequently, the load current, this being the sum of the current passing through the first and second parallel paths (one path through the amplifier 30 and the other path through the constant current source 36) will represent the actual magnitude of the variable condition that is being sensed. Hence, the current through the load 10, the load 10 being in series with the conductors 14 and 16, will be indicative of the actual magnitude or value determined by the sensor 152.

Should the current fluctuate in the second path, the second path including the current source 36, then the change in current will be reflected in the signal from the demodulator 52 and the DC amplifier at 30 will be amplifying an incorrect signal. Hence, even without precise regulation or stabilization provided by the current source 36, the load current will be truly representative of the magnitude of the variable condition.

Quite briefly, the constant current source 36 operates so that after its initial start up, there is a primary current path from the emitter of the transistor 70 to the collector thereof, through the two diodes 84 and 86, and then through the resistor network comprising the various resistors and thermistors 88-94. The purpose, as already explained, of the resistor 78 is solely for turning on the circuitry, for if the resistor 78 is not included, it is possible that the lack of leakage through the transistor 70, especially when cold, would not effect the turning on of the other transistors 72 and 74. Hence, the current leaking through the resistor 78 is blocked by the diodes 84 and 86 and must follow the path through the resistor 80. Upon entering the base of the transistor 72, which exhibits gain and has a collector voltage applied thereto by virtue of resistors 82 and 76, the collector current flows through the transistor 72 and simultaneously from the emitter to the base of the transistor 70. The transistor 70 responds by allowing collector current to flow down toward the diodes 84 and 86, the circuit then springing into full operation. The transistor 74 detects the level of the voltage at the junction to the left of the resistor 88. Should the current increase the voltage at this junction slightly, there will be more base current supplied to the transistor 74. On a current splitting basis, as one looks at the base of the transistor 72 and the resistor 80, the resistor 80 having essentially constant current flowing therethrough, if more current is sent through the collector of transistor 74, less is available to the base of transistor 72 which will reduce the net current drawn by the entire constant current source 36.

The temperature compensation is provided by the resistance network 88-96, the resistance thereof being reduced as the temperature thereof is increased. The net result, though, is that irrespective of the voltage at the junction 24 or the temperature to which the current source 36 is subjected, the output therefrom will be substantially constant and this allows the proper sensing to take place without introducing errors. Thus, the amplification provided by the DC amplifier 30 is controlled so that the total load current, this being the recombined current from the circuit including the amplifier 30 in the circuit including the source 36, will be indicative of the value of the variable condition being sensed at 152.

I claim:

1. A current transmitter comprising a pair of current terminals, first and second circuits connected in parallel with each other and in series with said terminals so that the current flowing through said first and second circuits also flows through said terminals, said first circuit including a direct current amplifier and said second circuit including a single constant current source, circuit means connected in series with said source so that all of the current flowing through said single constant current source flows through said circuit means for producing an alternating current derived entirely from said current flowing through said constant current source, means connected to said alternating current means for controlling said alternating current means in accordance with the magnitude of a variable condition, and means connected to said alternating current means for controlling said direct current amplifier, whereby the current flowing through said terminals is representative of the value of said variable condition.

2. A current transmitter as set forth in claim 1 in which said alternating current means includes an oscillator and alternating current amplifier in parallel therewith, said means for controlling said alternating current means in accordance with a variable condition including a chopper connected between said oscillator and alternating current amplifier so that said oscillator drives said chopper and said alternating current amplifier amplifies the output from said chopper, said means for controlling said alternating current means controlling the current to said chopper so that the output therefrom to said alternating current amplifier is changed in response to any change in the magnitude of said variable condition.

3. A current transmitter as set forth in claim 2 in which said means responsive to said alternating current means includes a demodulator connected between said alternating current amplifier and said direct current amplifier for controlling said direct current amplifier in accordance with the output from said demodulator.

4. A current transmitter as set forth in claim 1 in which said alternating current controlling means includes a resistance bridge having a temperature sensitive element therein.

5. A current transmitter comprising a pair of current terminals, first and second circuits connected in parallel with each other and in series with said terminals so that the current flowing through said first and second circuits also flows through said terminals, said first circuit including a direct current amplifier and said second circuit including a constant current source comprising first, second and third transistors, each transistor having a base, collector and emitter and said second and third transistors being of opposite conductivity type with respect to said first transistor, the emitters and collectors of said first and third transistors being connected in series to provide a first path, diode means and a temperature compensating resistance network, said diode means being connected to said first path between said first and third transistors and to said resistance network, the emitter and collector of said second transistor forming a second path in parallel with the emitter-collector path of said first transistor, the respective bases of said first and third transistors being connected to spaced points on said second path and the base of said second transistor being connected to a point between said first and third transistors in said first path, said first transistor providing a primary current path therethrough when conducting which continues through said diode means and compensating network, said current transmitter further including means connected in series with said source for producing an alternating current, means connected to said alternating current means for controlling said alternating current means in accordance with the magnitude of a variable condition, and means connected to said alternating current means for controlling said direct current amplifier, whereby the current flowing through said terminals is representative of the value of said variable condition.

6. A current transmitter comprising a pair of current terminals, first and second circuits connected in parallel with each other and in series with said terminals so that the current flowing through said first and second circuits also flows through said terminals, said first circuit including a direct current amplifier and said second circuit including a constant current source comprising first, second and third transistors, said second and third transistors being of NPN conductivity with said first transistor being of PNP conductivity and each transistor having an emitter, collector and base, diode means, the emitter of said first transistor being connected to one of said current terminals and the collector thereof being connected to one side of said diode means, a temperature compensating resistance network connected to the other side of said diode means to provide a primary current path through the emitter-collector of said first transistor when conductive, said diode means and said resistance network, means connected to the collector of said first transistor and to the base of said second transistor for initially rendering said second transistor conductive so as to cause said first transistor to conduct to provide said primary current path through said diode means and resistance network, the collector of said second transistor being connected to the said one current terminal and the emitter of said second transistor being connected to the junction of said diode means and said network, the base of said first transistor also being connected to said one current terminal, said second transistor providing a secondary current path through its collector and emitter, said diode means and resistance network, the base of said third transistor being connected to the junction of said diode means and said network to render said third transistor responsive to the voltage at the junction of said diode means and network for reducing the amount of conduction of said third transistor through its collector-emitter path to reduce the total current through said source, said current transmitter further including means connected in series with said source for producing an alternating current, means connected to said alternating current means for controlling said alternating current means in accordance with the magnitude of a variable condition, and means connected to said alternating current means for controlling said direct current amplifier, whereby the current flowing through said terminals is representative of the value of said variable condition.

7. A current transmitter as set forth in claim 6 in which said resistance network includes first, second and third resistors connected in series, a first thermistor in parallel with said first resistor and a second thermistor in parallel with said third resistor of said resistance network.

8. In a two-wire current transmitter, a constant current source having input and output junctions, the source comprising first, second and third transistors, each having a base, collector and emitter, diode means, a temperature compensating resistance network, the emitter of said first transistor being connected to said input junction and the collector thereof being connected to the anode side of said diode means, the cathode side of said diode means being connected to one side of said resistance network and the other side of said resistance network being connected to said output junction, a first resistor connected between the emitter and collector of said first transistor, a second resistor connected between the collector of said first transistor and the base of said second transistor and also to the collector of said third transistor, the emitter of said second transistor being connected to the junction of said diode means and network and also to the base of said third transistor, the emitter of said third transistor being connected to said output junction, a third resistor connected between the emitter of said first transistor and the base thereof, a fourth resistor connected between the base of said first transistor and the collector of said second transistor, whereby a primary current path exists through the emitter-collector of said first transistor, said diode means and said resistance network when said first transistor is conducting.

9. The combination of claim 8 in which said resistance network includes first, second and third serially connected resistors, a first thermistor connected in parallel with said first resistor and a second thermistor connected in parallel with said third resistor of said resistance network.

10. A current transmitter comprising a pair of current terminals, a direct current amplifier connected between said terminals through which amplifier a variable portion of the current flowing through said terminals passes and is controlled, a constant current source connected between said terminals and in parallel with said amplifier through which source a second portion of the current flows so as to be regulated thereby, a chopper drive and alternating current carrier amplifier connected in parallel with each other and in series with said current source, a chopper connected between said chopper drive and alternating current amplifier, a condition responsive bridge network for controlling said chopper in accordance with the magnitude of a variable condition, said bridge network being in series with said current source and in series with said alternating current amplifier to cause the current supplied by said current source to recombine with the current through said direct current amplifier, and a demodulator having its input connected to said alternating current carrier amplifier and its output connected to said direct current amplifier for controlling said direct current amplifier, whereby the current through said terminals will be indicative of the amount of variation occurring in the variable condition.

11. In a current transmitter, a constant current source having input and output junctions, the source comprising first, second and third transistors, each having a base, collector and emitter, diode means, a temperature responsive resistance network, the emitter of said first transistor being connected to said input junction and the collector thereof being connected to the anode side of said diode means, the cathode side of said diode means being connected to one side of said resistance network and the other side of said resistance network being connected to said output junction, a first resistor connected between the emitter and collector of said first transistor, a second resistor connected between the collector of said first transistor and the base of said second transistor and also to the collector of said third transistor, the emitter of said second transistor being connected to the junction of said diode means and network and also to the base of said third transistor, the emitter of said third transistor being connected to said output junction, whereby a primary current path exists through the emitter-collector of the first transistor, the diode means and said resistance network when said first transistor is conducting.

12. The combination of claim 11 in which said resistance network includes first, second and third serially connected resistors, a first thermistor connected in parallel with said first resistor and a second thermistor connected in parallel with said third resistor of said resistance network.

13. The combination set forth in claim 11 including means in series with said constant current source and energized solely thereby for providing a control signal in accordance with the magnitude of a variable condition, and a direct current amplifier in parallel with said constant current source and said means in series with said constant current source and connected to said constant current source so that said control signal controls said direct current amplifier.

* * * * *